United States Patent [19]

Van Den Bergh

[11] 4,174,678
[45] Nov. 20, 1979

[54] CABLE SPRAYING APPARATUS

[75] Inventor: William Van Den Bergh, Kentwood, Mich.

[73] Assignee: Utility Contracting Co., Sparta, Mich.

[21] Appl. No.: 836,026

[22] Filed: Sep. 23, 1977

[51] Int. Cl.$^2$ .................. B05C 5/00; B05B 3/18
[52] U.S. Cl. ............... 118/307; 118/DIG. 22
[58] Field of Search ............... 118/307, 305, DIG. 22; 184/15 A; 134/172, 175

[56] References Cited

U.S. PATENT DOCUMENTS

| | | | |
|---|---|---|---|
| 632,653 | 9/1899 | Lewis | 118/307 X |
| 632,654 | 9/1899 | Lewis | 118/DIG. 22 UX |
| 668,419 | 2/1901 | Russell | 118/DIG. 22 UX |
| 1,269,514 | 6/1918 | Ulrich | 118/208 |
| 2,253,019 | 8/1941 | Crepeau | 118/307 |
| 2,264,048 | 11/1941 | McMahon et al. | 118/DIG. 22 UX |
| 2,851,005 | 9/1958 | Pledger | 118/307 |
| 3,472,204 | 10/1969 | Zupan et al. | 118/307 X |
| 3,687,371 | 8/1972 | Swager | 118/305 X |
| 3,903,994 | 9/1975 | Hafner | 184/15 A |

FOREIGN PATENT DOCUMENTS

| | | | |
|---|---|---|---|
| 1658396 | 7/1970 | Fed. Rep. of Germany | 134/172 |
| 1394919 | 3/1965 | France | 118/307 |

Primary Examiner—Robert Mackey
Attorney, Agent, or Firm—John A. Waters

[57] ABSTRACT

A cable coating apparatus comprising a container mounted on a pole; two trolley wheels mounted within the container at an upper portion thereof for engagement with a supportive wire that supports a cable by spaced connectors, and nozzles mounted within the container pointed at the cable. Pivotably mounted within lower portion of the container is an upwardly spring biased lever arm with a roller mounted thereon in abutment with the underside of the cable. Two nozzles are mounted at the free end of the lever arm pointing upwardly to the cable. Two more nozzles are movably mounted at an upper portion of the container pointing downwardly to the cable. The supply conduit operably connects the nozzles to a supply tank and pump. A vertical shaft pivotally couples the lever arm to the top nozzles such that when the roller rolls along the cable and moves up and down due to the variations in the relative height of the cable, the bottom and top nozzles correspondingly move to maintain a predetermined distance with respect to the cable. The container retains excess and divergent spray from the nozzles and has a drain at the bottom portion thereof to recycle the spray back through the nozzles.

12 Claims, 6 Drawing Figures

CABLE SPRAYING APPARATUS

BACKGROUND OF THE INVENTION

1. Field of the Invention

This invention relates to a cable spraying apparatus for spraying insulating and coating material on cables and more particularly overhead cables which are supported by intervally spaced connectors which suspend the cable under an overhead supportive wire.

2. Description of the Prior Art

Thousands of miles of overhead cables have been installed on utility poles and telephone poles for the transmission of electric current. Many of these cables are desirably insulated for higher efficiency or for safety. These cables are in constant use for a period of many years. After a period of time the original coating becomes cracked, worn out, or develops a plurality of tiny pin holes, leaving the conductive cable exposed to the natural elements. Many miles of the original coating comprise a lead wrapper about the cable. The lead wrapper is particularly prone to develop a plurality of pin holes therethrough leaving the cable exposed. The cable must be recoated before the natural elements corrode and break the cable which stops the flow of electricity.

Because the overhead cables are many feet above the ground, particular problems are encountered with recoating the cables. It is uneconomical and dangerous to elevate a person by hoist to spray or brush coating material onto the cable. Consequently, a device must remotely apply a coating onto the cable.

Certain apparatus have already been developed to solve some of the problems with recoating overhead cables. One device is disclosed in U.S. Pat. No. 1,269,514 issued to Ulrich on June 11, 1918. Ulrich discloses an insulation repairing device comprising a receptacle containing heated and liquified coating material. A cover to the receptacle has trolley wheels mounted thereon for engagement with the cable. A roller is spring mounted on the receptacle. The roller comprises a pair of discs with bristles pointing upwardly. The cable passes through the bristles forcing the roller to rotate, dipping the bristles into the liquified coating material and brushing the material onto the cable.

U.S. Pat. No. 632,654 issued to Lewis on Sept. 5, 1899, discloses an insulating apparatus mounted atop a pole. The apparatus has a receptacle for liquified coating material. A pulley has a belt dipping into the receptacle and moving upward and entrained around a top pulley. The top pulley has a blade which transfers the liquid coating onto a serrated wheel which rests on the cable. The serrated wheel transfers the coating onto the cable. A spongeous mop is mounted to the receptacle and engages the underside of the cable to wipe off excess coating.

U.S. Pat. No. 2,253,019 issued to Crepeau on Aug. 19, 1974, discloses a pump spray device mounted atop a pole. An operator has a wagon mounting the supply tank of coating material and the pump. Conduit hoses lead from the wagon up a pole to the spraying apparatus. The spraying apparatus is mounted on a supportive wire by two trolley wheels. Two top nozzles point downwardly onto the cable and the bottom nozzle points upwardly to the cable. The nozzles are operably connected to the hoses. The top nozzles are manually adjustable to a desired distance from the cable.

U.S. Pat. No. 2,264,048 issued to McMahon et al on Nov. 25, 1941, discloses a self-propelled apparatus. Downwardly extending tubular nozzles are on both sides of the cable. The tubular nozzles are pivotably mounted by L and T joints to allow the nozzles to pivot out of the way of interferring telephone or utility poles and pivot back to their free position when they pass the utility pole. In this fashion the self-propelled apparatus can continually spray the cable without interruption from the spaced supporting poles.

Two problems are encountered with spraying thick tar-like coating material on overhead cables. First, it is difficult to control the amount and uniformity of the coating sprayed onto the cable. Second, the amount of spray which is put on the cable is a small portion of the total amount of spray exiting from the nozzle. The excess or divergent spray results in much waste.

As to the first problem, often the amount sprayed is too little to effectively coat the cable or it is too much, which causes excessive dripping and a waste of material. There are two factors causing one portion of the cable to receive too little coating while another portion receives too much. One factor is that the cable is not uniformly suspended from its supportive wire. Rings which are attached to the wire and through which the cable extends and is supported thereby are different sizes. The cable rises and dips from ring to ring depending on the size of the successive rings.

The second factor is that the density of the spray varies inversely with the distance between the cable and the nozzle. As such, when the nozzles of the spraying apparatus become too far away, the spray becomes too thin, and when the nozzles become too close to the cable, the spray becomes excessive. As to the second problem, a shield or container is needed to substantially surround the nozzles to retain and recycle divergent spray. However, a container would normally interfere with the remote mounting and dismounting of the apparatus with the supportive wire.

One of the objects of the present invention is to provide an improved cable coating apparatus that provides an even and consistent coating on a cable even though the cable may hang at different distances from the supporting wire.

Another object of present invention is to provide a cable coating apparatus that collects and recycles excess coating material, yet does not interfere with the remote mounting and dismounting of the apparatus on the supporting wire.

SUMMARY OF THE INVENTION

According to the invention, a cable spraying apparatus includes a frame and traveling means connected to the frame for moving the frame on an overhead supportive wire which supports a cable by intervally spaced connectors therebetween. The traveling means is preferably two trolley wheels rotatably mounted on the upper portion of the frame. At least one spray nozzle is mounted on the frame and pointed toward the cable. Each spray nozzle is operably connected to a supply conduit which has its other end operably connected to a supply means. Nozzle mounting means, connected to the frame, mount each spray nozzle for vertical movement with respect to the traveling means. The nozzle mounting means is responsive to the position of the cable and maintains each spray nozzle at a predetermined distance from the cable as the apparatus moves along the supportive wire.

Preferably, the frame is mounted atop a pole such that an operator on the ground can move the pole and control the vertical, lateral and longitudinal movement of the frame. The pole comprises an element of the traveling means. The supply means is portable and moves along the ground and supplies coating material to each nozzle under pressure.

The nozzle mounting means includes a means for sensing the distance of the cable below the supportive wire and means operably connected to the sensing means for moving each nozzle correspondingly upwardly and downwardly as the distance of the cable below the supportive wire becomes lesser and greater as the apparatus moves therealong.

Preferably, the sensing means is roller mounted to the frame for vertical movement with respect to the traveling means. The roller is also upwardly biased to ride along the underside of the cable. Preferably, the roller is mounted on a lever arm pivotably attached to the frame, with a spring extending between the lever arm and the frame biasing the lever arm upwardly. The roller desirably is rotatably mounted on brackets upwardly extending from the lever arm. The roller engages the cable such that the lever arm is in substantially horizontal position.

In one embodiment, each of two lower nozzles is mounted on the lever arm for movement therewith. In addition, coupling means connect each of two top nozzles to the lever arm for movement therewith. Preferably, the coupling means include a vertical shaft pivotally mounted to the lever arm about a horizontal axis transverse to the length of the cable. Each top nozzle is pivotally connected to the top of the vertical shaft along a parallel axis.

In one specific embodiment, two top and two bottom nozzles are horizontally spaced apart from the vertical plane defined by the cable and are angled to point toward the cable.

Further, according to the invention, the frame comprises a container with a top, bottom, and sides substantially surrounding the nozzles and traveling means. The container has a longitudinal slot in one side such that the container can move sideways on and off the supportive wire and cable. The container further has openings at two opposite ends such that the supportive wire and cable can pass through the container as the apparatus travels along the supportive wire.

Preferably, a flap door is mounted to cover the longitudinal opening of the container. Means for remotely opening the flap door is mounted thereon. Means pivotally mount the flap door to the side of the container such that the door is movable between a closed and open position with respect to the longitudinal opening. Means for biasing the flap to a closed position is attached thereto.

The remote opening means includes the pole for controlling the lateral and vertical movement of the frame and a flange which is rigidly connected to an edge of the flap door and outwardly extends at an acute angle therefrom. The flange extends outwardly such that its inside surface can abut the supportive wire and be forced upwardly by the wire when the frame is vertically moved to position the wire between the flange and frame. Preferably, the lever arm includes means for remotely pivoting the lever arm downwardly such that the supportive wire can be engaged with and disengaged from the traveling means free of interference from the roller, lever arm or bottom nozzles.

BRIEF DESCRIPTION OF THE DRAWINGS

Reference will now be made to the drawings in which.

DETAILED DESCRIPTION OF THE PREFERRED EMBODIMENT

Figure 1:
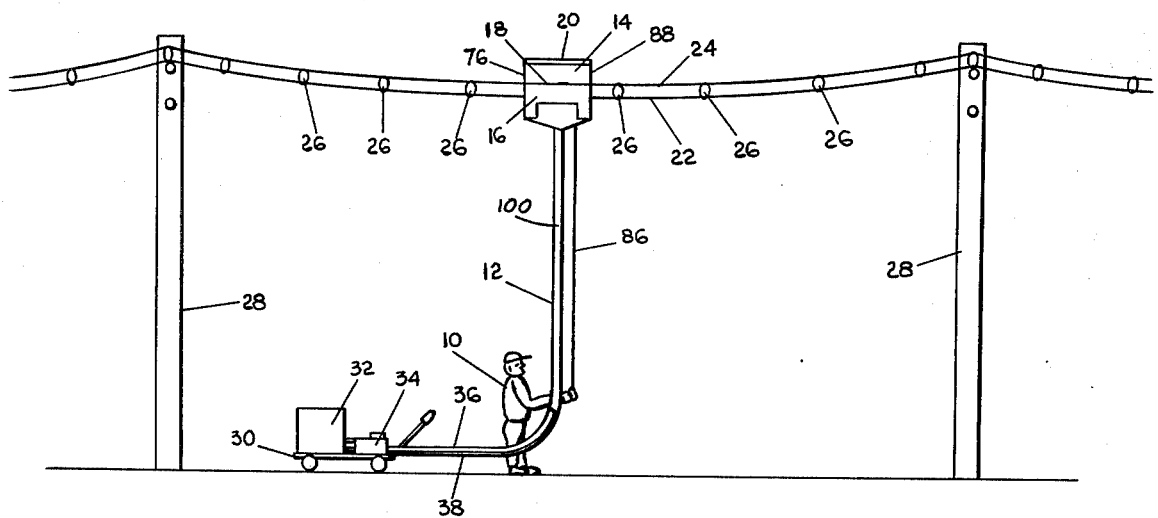
FIG. 1 is a general side elevational view illustrating an embodiment of the invention in use.

Referring to the drawings, particularly FIG. 1, an operator 10 is holding a pole 12. A container 14 is mounted atop the pole. The container 14 has a longitudinal slot 17 in wall 15. A side flap door 16 pivotally mounted about top edge 18 to the container and covers the slot 17. The container 14 has a cover 20. A cable 22 is suspended from a supportive wire 24 by intervally spaced rings 26. The cable 22 and wire 24 pass through the container 14 through side walls 76 and 88. The wire 24 and cable 22 are attached to utility poles 28.

In close proximity to the operator 10 is a supply wagon 30. The supply wagon has mounted thereon a supply tank 32 and a portable pump 34. Supply hose 36 is operably connected to the pump and supply tank 32 and mounted to pole 12 and to the container 14. A return hose 38 is operably connected to the supply tank 32 and container 14.

Figure 2:
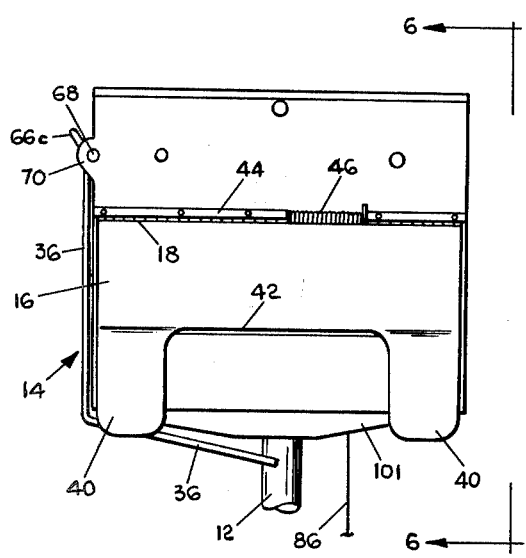
FIG. 2 is an enlarged side elevational view of the cable apparatus shown in FIG. 1.
Figure 6:
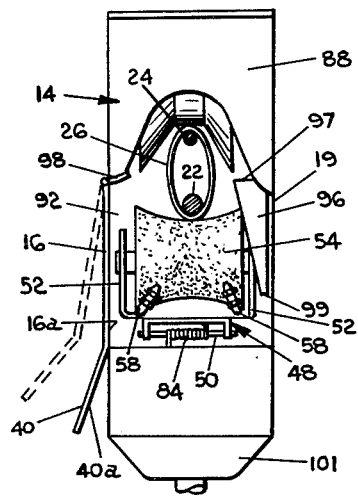
FIG. 6 is a rear elevational view of the apparatus taken along lines 6—6 in FIG. 2.
Figure 5:
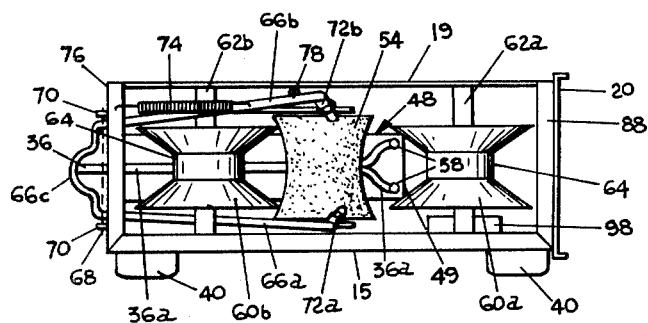
FIG. 5 is a top plan view of the apparatus shown in FIG. 2 with the cover in a fully open position.

Referring particularly to FIGS. 2, 5 and 6, the container has four side walls 15, 19, 76 and 88. The side flap door is mounted over opening 17 in side wall 15. The flap door 16 has two downwardly and outwardly extending flanges 40 attached to its bottom edge 42. A top edge 18 of flap door 16 is pivotally mounted to side wall 15 by hinge 44. Hinge 44 has a spring 46 mounted thereto which biases the flap door 16 to a closed position as shown in FIGS. 2 and 6.

Figure 4:
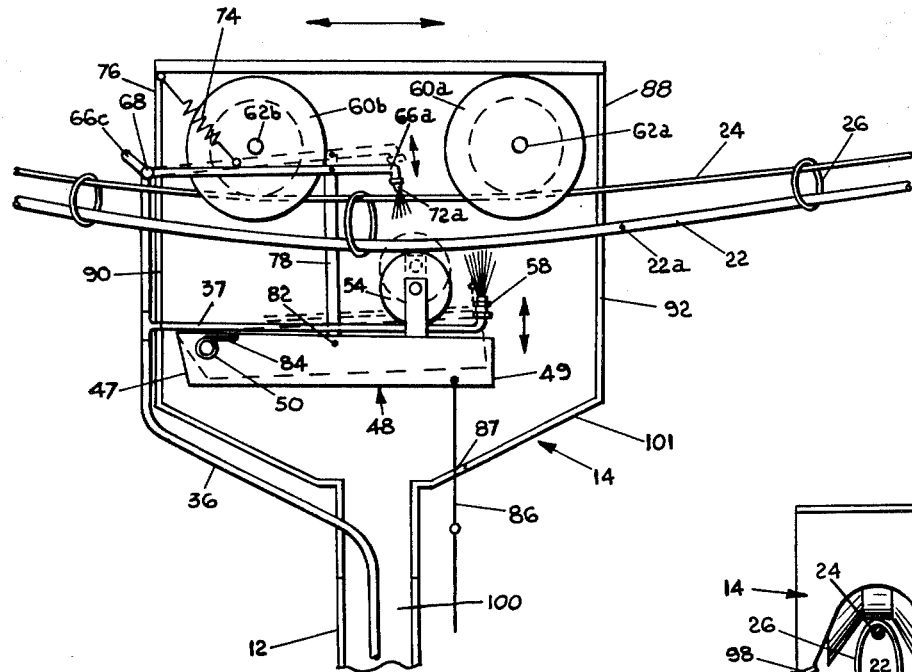
FIG. 4 is a segmented side elevational view of cable apparatus shown in FIG. 2.

As shown in FIG. 4, lever arm 48 is pivotally mounted at one end 47 about a horizontal axis defined by rod 50. A spring 84 is mounted about rod 50 to pivotably bias the lever arm 48 to an upward position. Two vertical brackets 52 upwardly extend from lever arm 48 as clearly shown in FIG. 6. A roller 54 is rotatably mounted about a horizontal axis defined by pins 56 attached to the vertical flanges 52. The roller 54 has a slightly concave surface as clearly shown in FIGS. 5 and 6. Roller 54 is made from a porous and slightly flexible material such as a plastic foam. Two bottom nozzles 58 are fastened near the free end 49 of the lever arm 48. The nozzles 58 are aimed toward the cable as shown in FIG. 6. Supply hose branches 37 extend along lever arm 48 and operably connect hose 36 with the nozzles 58. A pullstring 86 extends downwardly from the free end 49 of arm 48 and extend through a small opening 87 in container 14. The pullstring 86 is operable from ground level.

Referring more particularly to FIG. 4, two trolley wheels 60a and 60b are mounted at a top portion of the container 14 about mounting pins 62a and 62b. The trolley wheels 60a and 60b each have a central groove 64, as shown in FIGS. 5 and 6, that rides on and retains the supportive wire 24. The trolley wheels 60a and 60b guide the apparatus along the supportive wire and cable as the operator slides the pole 12 along the wire.

Supply hose 36 is operably connected to a rigid supply conduit 66. The rigid conduit includes a first section pivotally mounted about horizontal axis 68 by appropriate brackets 70. Two branches 66a and 66b of the supply conduit extend under the mounting pins 62a and 62b and are operably connected to two top nozzles 72a and 72b. The nozzles 72a and 72b are aimed downwardly toward the cable. The orifices of the nozzles desirably have a diameter of approximately 0.026 inches. A tension spring 74 is attached at one end to a front wall 76 of the container 14. The spring 74 has another end attached to the supply conduit 66b and upwardly biases the supply conduits 66a and 66b. A vertical shaft 78 is pivotally connected to rigid supply conduit branch 66b adjacent the side wall 19 of container 14. The vertical shaft 78 has its bottom end 82 pivotally connected about a horizontal axis transverse to the length of the cable to lever arm 48.

The side walls 76 and 88 both have notched openings 90 and 92, respectively, which form a continuous opening with front opening 17.

Figure 3:
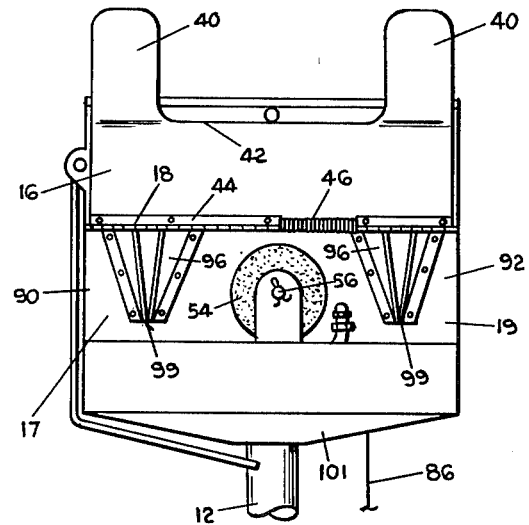
FIG. 3 is a side elevational view of the apparatus shown in FIG. 2 showing the flap door in an open position.

Referring to FIG. 3, the side wall 19 has drain plates 96 mounted thereon. The plates 96 extend toward the interior of the container 14. Each plate is bent to form a passage between itself and the side wall 19. An open top 97 and bottom 99 allows drainage through the passage.

A guide plate 98 is attached to side wall 15 above flap door 16 and below pin 62a. Guide plate 98 is curved, with its convex surface facing down. The guide plate extends almost to trolley wheel 60a and axle 62a.

In operation, the operator lifts pole 12 and guides container 14 to the proximity of the overhead wire 24 and cable 22. The operator then pulls wire 86 downward to pull the roller 54 and lever arm 48 downwardly below the front opening 17. The wire 24 and cable 22 are positioned to abut the inner surface 40a of flanges 40. The operator then lowers the container such that the flanges 40 are forced by the wire 24 to open the flap door 16. The supportive wire is then guided by the inside surface of the flap door and guide plate 98 to laterally enter the container and engage the grooves 64 of the trolley wheels 60a and 60b. The spring 44 closes flap door 16. The operator then releases the pull wire 86 so that lever arm 48 and roller 54 are biased upwardly. The pump is then turned on. The pump supplies a pressure between 400 and 800 PSI. A spray coating material such as an oil base, tar-like substance marketed under the trademark PENZOIL X280 is pumped through the supply hoses. The operator 10 controls pole 12 to move the container 14 along the wire as shown in FIG. 1 from a right to left direction. The wire 24 and cable 22 enter the opening 90 through the wall 76 and withdraw from the opening 92 in wall 88. The roller 54 abuts the suspended cable 22 as the container rolls along the supportive wire 22. As the cable 22 sags between two rings, the roller 54 is pivoted downwardly by the weight of the cable. The bottom nozzles 58 and top nozzles 72a and 72b are correspondingly forced downwardly the same distance by the roller 54 such that the distance between the top nozzles 72a and 72b and bottom nozzles 58 from the cable is substantially fixed. When the cable rises or the weight of the cable is lessened, the roller 54 is biased upward until resistance from the cable counteracts the upward bias from springs 74 and 84.

As shown in FIG. 1, the phantom outline of the roller, nozzles and lever arm indicates the position of the mentioned parts when the roller 54 abuts point 22a along cable 22. The sprayed cable withdraws from the notched opening 92 in the rear wall 88. The spring biased roller 54 allows differently sized rings 26 to pass through the cable spraying apparatus without obstruction or interference.

The divergent spray which misses the wire and cable is retained by the container and is free to drain down through the drain guides 96 and vertical walls to the bottom portion 101 of the container 14. A drain 100 is connected through return hose 38 to the supply tank 32 for recycling the divergent spray.

When the coating is done between two utility poles, the operator merely pulls on wire 86 to disengage the roller 54 from the cable and lifts the container 14 to disengage the trolley wheels 60a and 60b from the supportive wire 24 and laterally moves the container such that the wire forces the flap door open and exits from the container. The pull wire can then be released. Lever arm 48 and rigid conduits 66a and 66b are then biased upward by the springs 74 and 84. The rigid conduits 66a and 66b abut the mounting pin 62b to define the upward limit of movement of the nozzles 58 and 72a and 72b.

In this fashion, a cable spraying apparatus is easily engageable and disengageable from an overhead cable, and applies an even coating onto the cable and provides for a minimum amount of waste by recycling any divergent spray coating material.

Reasonable variation and modification are possible within the scope of the foregoing disclosure, drawings, and appended claims without departing from spirit of the invention.

The embodiments of the invention in which an exclusive property or privilege is claimed are defined as follows: I claim:

1. In cable spraying apparatus for spraying a coating material on a cable that is suspended from an overhead supportive wire by intervally spaced connectors, said cable spraying apparatus including a frame; traveling means for suspending the frame from the overhead supportive wire for movement along the supportive wire; at least one spray nozzle mounted to the frame and pointed toward the cable; each spray nozzle being operably connected to a supply means for supplying coating material under pressure through each nozzle; the improvement comprising:

nozzle mounting means connected to the frame for mounting each spray nozzle to the frame for vertical movement with respect to the traveling means, the nozzle mounting means being responsive to the cable position and maintaining each spray nozzle at a predetermined distance from the cable as the apparatus moves along the supportive wire, even though the distance between the cable and supportive wire varies along the length of the cable, the nozzle mounting means including:

sensing means for sensing the distance of the cable below the supportive wire, the sensing means being mounted under the cable and being vertically movable in the frame with respect to the traveling means, the sensing means including biasing means for resiliently biasing the sensing means upwardly so as to ride along the underside of the cable as the apparatus moves along the supportive wire; and nozzle moving means interconnecting the nozzle with the sensing means for vertical movement therewith such that the nozzle is spaced a predetermined distance from the cable and is maintained at that distance even though the distance between the cable and the supportive wire varies;

movement means for moving the cable spraying apparatus along the cable, said movement means comprising a pole extending downwardly from the frame toward the ground for manual movement of the frame, the supply means being movable along with the frame as the frame is moved along the supportive wire; and means for remotely moving the sensing means downwardly such that the nozzle and nozzle mounting means are moved away from the supportive wire and cable a sufficient distance to permit lateral movement of the apparatus to mount and dismount the apparatus on the supportive wire and cable.

2. Apparatus as defined in claim 1 wherein the sensing means includes a roller and roller mounting means for mounting the roller onto the frame under the cable so as to permit vertical movement of the roller with respect to the traveling means, the biasing means resiliently biasing the roller upwardly to abut the cable such that the roller rolls along the underside of the cable as the apparatus moves along the supportive wire.

3. Apparatus as defined in claim 2 wherein:

the roller mounting means include a lever arm pivotably mounted to the frame for pivotal movement in a vertical plane, the roller being mounted on a free end of the lever arm;

the biasing means include a tension spring extending between the lever arm and frame, said spring upwardly biasing the lever arm such that the roller resiliently bears against the underside of the cable;

the nozzle moving means include means for connecting the nozzle to the lever arm for vertical movement therewith such that the nozzle is spaced a predetermined distance from the cable and is maintained at that distance even though the distance between the cable and the supportive wire varies.

4. Apparatus as defined in claim 3 wherein:

the apparatus includes at least one top spray nozzle mounted above the cable; and the nozzle mounting means includes:

a rigid conduit operably connecting each top spray nozzle to the supply means; and means for pivotably mounting the rigid conduit to the frame so as to permit vertical movement of the top spray nozzle with respect to the frame.

5. Apparatus as defined in claim 1 wherein the frame includes:

a container substantially surrounding the cable for containing substantially all divergent spray from the nozzle;

means for collecting the divergent spray at the bottom of the container;

drain means in the bottom of the container for draining the spray from the container; and means for recycling the divergent spray through the nozzles.

6. Apparatus according to claim 1 and further comprising an enclosure enclosing the cable spraying apparatus so as to prevent loss of coating material, said enclosure including openings in opposite ends thereof such that the cable and supportive wire can pass therethrough, the enclosure further including opening means therein for permitting movement of the wire and cable into and out of the enclosure for mounting and dismounting the cable spraying apparatus on the wire, said opening means permitting mounting and dismounting of the cable spraying apparatus by the operator manipulating the pole extending downwardly from the frame toward the ground as he stands on the ground, the opening means being enclosed such that coating material is not lost through the opening means when the cable spraying apparatus is mounted on the wire and in operation.

7. In cable spraying apparatus for spraying a coating material on a cable that is suspended from an overhead supportive wire by intervally spaced connectors, said cable spraying apparatus including a frame; traveling means for suspending the frame from the overhead supportive wire for movement along the supportive wire; at least one spray nozzle mounted in the frame and pointed toward the cable; the spray nozzle being operably connected to a supply means for supplying coating material under pressure through the nozzle; the improvement comprising:

nozzle mounting means connected to the frame for mounting the spray nozzle to the frame for vertical movement with respect to the traveling means, the nozzle mounting means including sensing means for sensing the distance of the cable below the supportive wire and nozzle moving means operably connected to the sensing means for moving the nozzle correspondingly upwardly and downwardly as the distance of the cable below the supportive wire becomes lesser and greater as the apparatus moves along the supportive wire, such that the nozzle mounting means maintains the spray nozzle at a predetermined distance from the cable as the apparatus moves along the supportive wire, even though the distance between the cable and supportive wire varies along the length of the cable;

a container substantially surrounding the cable for containing substantially all divergent spray from the nozzle;

means for collecting the divergent spray at the bottom of the container;

drain means in the bottom of the container for draining the spray from the container;

means for recycling the divergent spray through the nozzles;

a longitudinal opening in a side of the container such that the container can be moved sideways on and off the supportive wire and cable;

a flap door pivotably mounted on the container to cover the longitudinal opening such that the flap door is movable between a closed and open position with respect to the longitudinal opening;

means for biasing the flap door to the closed position; and means for opening and closing the flap door from the ground to allow the supportive wire and cable to be laterally received into the container through the longitudinal opening.

8. In cable spraying apparatus including a frame; traveling means for moving the apparatus along an overhead supportive wire which supports, by intervally spaced connectors, a cable; at least one spray nozzle mounted in the frame and pointing toward the cable; the spray nozzle being operably connected to a supply conduit to supply coating material through the nozzle; the improvement comprising:

the frame comprising a container substantially enclosing the nozzle and traveling means;

openings in opposite ends of the container such that the cable and supportive wire can pass through the container;

a longitudinal opening in a side of the container and extending between the openings in the two opposite ends such that the container can be moved sideways on and off the supportive wire and cable;

means operably connected to the bottom of the container for recycling the excess or divergent spray through the nozzle;

a flap door pivotably mounted along an edge thereof over the longitudinal opening such that the flap door is movable between a closed and open position with respect to the longitudinal opening;

means for biasing the flap door to a closed position; and means for opening and closing the flap door from the ground.

9. Apparatus as defined in claim 8 wherein the opening and closing means includes:

a pole extending downwardly from the frame to the ground such that the operator can vertically and laterally control the movement of the frame; and at least one flange extending outwardly from the flap door, such that the supportive wire fits between the flange and container, the flange being inclined such that vertical motion of the container in a predetermined direction with the supportive wire engaging the flange forces the flap door open to permit the cable and wire to enter the longitudinal opening in the container.

10. In cable spraying apparatus for spraying a coating material on a cable that is suspended from an overhead supportive wire by intervally spaced connectors, said cable spraying apparatus including a frame; traveling means for suspending the frame from the overhead supportive wire for movement along the supportive wire; at least one spray nozzle mounted to the frame and pointed toward the cable; each spray nozzle being operably connected to a supply means for supplying coating material under pressure through each nozzle; the improvement comprising:

nozzle mounting means connected to the frame for mounting each spray nozzle to the frame for vertical movement with respect to the traveling means, the nozzle mounting means being responsive to the cable position and maintaining each spray nozzle at a predetermined distance from the cable as the apparatus moves along the supportive wire, even though the distance between the cable and supportive wire varies along the length of the cable, the nozzle mounting means including:

sensing means for sensing the distance of the cable below the supportive wire; the sensing means including a roller, roller mounting means for mounting the roller in the frame under the cable so as to permit vertical movement of the roller with respect to the traveling means, and biasing means for resiliently biasing the roller upwardly to abut the cable such that the roller rolls along the underside of the cable as the apparatus moves along the supportive wire; the mounting means for mounting the roller comprising a lever arm pivotably mounted to the frame for pivotal movement in a vertical plane, the roller being mounted on a free end of the lever arm;

the biasing means including a spring extending between the lever arm and frame, said spring upwardly biasing the lever arm such that the roller resiliently bears against the underside of the cable; and nozzle moving means operably connected to the sensing means for moving each nozzle correspondingly upwardly and downwardly as the distance of the cable below the supportive wire becomes lesser and greater as the apparatus moves along the supportive wire; the nozzle moving means including means for connecting the nozzle to the lever arm for vertical movement therewith such that the nozzle is spaced a predetermined distance from the cable and is maintained at that distance even though the distance between the cable and the supportive wire varies;

movement means for moving the cable spraying apparatus along the cable, said movement means comprising a pole extending downwardly from the frame toward the ground for manual movement of the frame, the supply means being movable along with the frame as the frame is moved along the supportive wire; and means for remotely pivoting the lever arm downwardly such that the roller, lever arm, and nozzle are moved away from the supportive wire and cable a sufficient distance to permit lateral movement of the apparatus to mount and dismount the apparatus on the supportive wire and cable.

11. Cable spraying apparatus for spraying a coating material on an overhead cable that is suspended from a supportive wire, comprising:

a frame;

wheeled support means mounted in the frame for suspending the frame from the supportive wire for movement along the wire;

spray nozzle means for spraying coating material on the cable, the spray nozzle means including an upper spray nozzle positioned above the cable and directed downwardly toward the cable and a lower spray nozzle positioned below the cable; and nozzle mounting means for mounting the nozzles for vertical movement in the frame, the nozzle mounting means including:

a rigid conduit pivotably mounted in the frame for movement in a vertical plane, the upper nozzle being mounted on one end of the conduit and a supply means being connected to the other end of the conduit, the conduit conveying coating material from the supply means to the upper nozzle;

a lever arm pivotably mounted in the frame for movement in a vertical plane below the cable, the lower nozzle being mounted for vertical movement with the lever arm, conduit means interconnecting the supply means with the lower nozzle for conveying coating material to the lower nozzle;

a roller rotatably mounted on the lever arm for rolling engagement with the underside of the cable, the roller being resiliently biased in an upward direction such that the roller remains in continuous contact with the underside of the cable, the engagement between the roller and the cable controlling the position of the lever arm and the pivotally mounted roller; and mechanical linkage means for interconnecting the lever arm with the rigid conduit such that the upper nozzle is pivoted upwardly and downwardly in accordance with upward and downward movement of the lever arm;

the nozzle mounting means being constructed so as to hold the upper and lower nozzles in a predetermined position relative to the cable as the frame is moved along the supportive wire, regardless of variations in the distance between the wire and the cable;

supply means for supplying coating material under pressure to the spray nozzles; and a pole extending downwardly from the frame toward the ground such that an operator on the ground can move the frame along the wire by manipulating the pole.

12. Apparatus according to claim 11 and further comprising means for remotely pivoting the lever arm downwardly a sufficient distance to enable the operator to fit the supportive wire and cable sideways between the wheeled support means and the roller of the nozzle mounting means in mounting and dismounting the cable spraying apparatus on the supportive wire for cable spraying purposes.

* * * * *